United States Patent
Zhou et al.

(10) Patent No.: US 8,849,300 B2
(45) Date of Patent: Sep. 30, 2014

(54) METHOD, SYSTEM AND DEVICE FOR POSITIONING MOBILE TERMINAL

(75) Inventors: Lei Zhou, Beijing (CN); Xufeng Zheng, Beijing (CN); Zheng Zhao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 13/265,792

(22) PCT Filed: Apr. 22, 2010

(86) PCT No.: PCT/KR2010/002522
§ 371 (c)(1),
(2), (4) Date: Oct. 21, 2011

(87) PCT Pub. No.: WO2010/123291
PCT Pub. Date: Oct. 28, 2010

(65) Prior Publication Data
US 2012/0040694 A1 Feb. 16, 2012

(30) Foreign Application Priority Data
Apr. 22, 2009 (CN) .......................... 2009 1 0133686

(51) Int. Cl.
*H04W 24/00* (2009.01)
*G01S 5/06* (2006.01)
(52) U.S. Cl.
CPC ...................................... *G01S 5/06* (2013.01)
USPC ...................................................... 455/456.1
(58) Field of Classification Search
USPC .................... 455/9, 572, 456.1, 455; 370/315
See application file for complete search history.

(56) References Cited

U.S. PATENT DOCUMENTS

| | | | |
|---|---|---|---|
| 6,400,968 B1* | 6/2002 | White et al. | 455/572 |
| 6,512,478 B1* | 1/2003 | Chien | 342/357.25 |
| 2002/0086682 A1* | 7/2002 | Naghian | 455/456 |
| 2003/0100318 A1* | 5/2003 | Larsson et al. | 455/456 |
| 2003/0157943 A1* | 8/2003 | Sabat, Jr. | 455/456 |
| 2006/0014548 A1* | 1/2006 | Bolin et al. | 455/456.1 |
| 2006/0293061 A1* | 12/2006 | Kobayashi et al. | 455/455 |

(Continued)

FOREIGN PATENT DOCUMENTS

| KR | 10-0852445 B1 | 8/2008 |
|---|---|---|
| KR | 10-2008-0099940 | 11/2008 |
| KR | 10-2009-0037940 | 4/2009 |

OTHER PUBLICATIONS

International Searching Report dated Nov. 30, 2010 in connection with International Patent Application No. PCT/KR2010/002522.

(Continued)

*Primary Examiner* — Melody Mehrpour

(57) ABSTRACT

This invention provides a method, system and device for positioning a mobile terminal. The method includes: instructing, by a serving base station or an upper level relay, measuring a transmission time of a positioning signal with the mobile terminal, and instructing two relays in a serving cell to measure the transmission time of the positioning signal with the mobile terminal; and calculating, by the serving base station or the upper level relay, a position of the mobile terminal according to the transmission time of the positioning signal, the position of the serving base station or the upper level relay and the position of the two relays. The method, system and device provided by the present invention can reduce communication overhead in mobile terminal positioning, and improve the positioning accuracy of mobile terminal positioning.

22 Claims, 14 Drawing Sheets

(56) References Cited

U.S. PATENT DOCUMENTS

| | | | |
|---|---|---|---|
| 2007/0097900 A1* | 5/2007 | Kim et al. | 370/318 |
| 2010/0323720 A1* | 12/2010 | Jen | 455/456.1 |
| 2011/0223855 A1* | 9/2011 | Frenger et al. | 455/9 |
| 2012/0294229 A1* | 11/2012 | Saito et al. | 370/315 |

OTHER PUBLICATIONS

Written Opinion of International Searching Authority dated Nov. 30, 2010 in connection with International Patent Application No. PCT/KR2010/002522.

* cited by examiner

METHOD, SYSTEM AND DEVICE FOR POSITIONING MOBILE TERMINAL

CROSS-REFERENCE TO RELATED APPLICATION(S)

The present application claims priority under 35 U.S.C. §365 to International Patent Application No. PCT/KR2010/002522 filed Apr. 22, 2010, entitled "METHOD, SYSTEM AND DEVICE FOR POSITIONING MOBILE TERMINAL". International Patent Application No. PCT/KR2010/002522 claims priority under 35 U.S.C. §365 and/or 35 U.S.C. §119(a) to Chinese Patent Application No. 200910133686.0 filed Apr. 22, 2009 and which is incorporated herein by reference into the present disclosure as if fully set forth herein.

TECHNICAL FIELD

The present invention relates to the field of wireless mobile communication technology, and particularly to a method, system and device for positioning a mobile terminal.

BACKGROUND ART

Along with the popularity of wireless mobile communication networks, mobile terminal positioning techniques are more and more used in practice. The mobile terminal positioning techniques include satellite wireless positioning techniques and terrestrial wireless positioning techniques. Specifically, the satellite wireless positioning techniques may implement three-dimension mobile terminal positioning using the Global Positioning System (GPS), but the cost for the mobile terminal positioning is higher. The terrestrial wireless positioning techniques implement two-dimension mobile terminal positioning by measuring parameters such as the propagation time, the field intensity of signal, the phase, or the incident angle of a transmission signal or the like, the implementation is easy and the cost is lower. At present, the terrestrial wireless positioning techniques are usually used for positioning a mobile terminal.

Mobile terminal positioning implemented using the terrestrial wireless positioning techniques often uses the positioning method based on the wireless mobile communication network. That is, multiple base stations in the wireless mobile communication network control and measure the transmission signal between the mobile terminal and themselves simultaneously to obtain the parameter of the transmission signal, and positioning estimation is performed for the mobile terminal using a predetermined measurement algorithm. In such a mobile terminal positioning process, the accuracy of the mobile terminal positioning is determined by the accuracy of the obtained parameter of the transmission signal, and the propagation of the transmission signal highly depends on the channel characteristics of the wireless mobile communication network, thus the final accuracy of the mobile terminal positioning relies on the channel characteristics of the wireless mobile communication network.

Specifically, the mobile terminal positioning method using the terrestrial wireless positioning techniques may be a Time Difference of Arrival (TDOA) method. The TDOA method specifically includes the following. When positioning is performed for the mobile terminal, the serving base station that serves the mobile terminal obtains the transmission time of a positioning signal between the serving base station and the mobile terminal as well as between two base stations relatively near the mobile terminal and the mobile terminal respectively. Then, the serving base station performs calculation according to Math Figure 1 to obtain the position of the mobile terminal.

MathFigure 1

$$\begin{cases} \left(\sqrt{(x_0-x_2)^2+(y_0-y_2)^2} - \sqrt{(x_0-x_1)^2+(y_0-y_1)^2}\right)^2 = R_{21}^2 \\ \left(\sqrt{(x_0-x_3)^2+(y_0-y_3)^2} - \sqrt{(x_0-x_1)^2+(y_0-y_1)^2}\right)^2 = R_{31}^2 \end{cases} \quad \text{[Math. 1]}$$

Specifically, the coordinates of the position of the mobile terminal are (x0, y0), the coordinates of the position of the serving base station are (x1, y1), and the coordinates of the position of the two base stations relatively near the mobile terminal are (x2, y2) and (x3, y3) respectively.

$R_{21} = c \times t_{21}$ and $R_{31} = c \times t_{31}$, where c is the propagation velocity of the positioning signal in the air, t21 represents a difference in the transmission time of the positioning signal between one of the relatively-near base stations and the serving base station, and t31 represents the difference in the transmission time of the positioning signal between the other relatively-near base station and the serving base station.

Here, there are two methods for the serving base station to obtain the transmission time of the positioning signal between the serving base station and the mobile terminal as well as between the two base stations relatively near the mobile terminal and the mobile terminal respectively. In the first method, the mobile terminal sends an uplink ranging signal, and after the serving base station and the two base stations relatively near the mobile terminal measure the transmission time required for receiving the uplink ranging signal, the two base stations relatively near the mobile terminal report the transmission time of the uplink ranging signal obtained by performing the measurement to the serving base station. In the second method, the serving base station instructs the serving base station and the two base stations relatively near the mobile terminal to send a downlink positioning signal to the mobile terminal respectively, and after measuring the transmission time required for receiving the downlink positioning signal respectively, the mobile terminal reports the same to the serving base station.

DISCLOSURE OF INVENTION

Technical Problem

As can be seen, in order to use the TDOA method to perform positioning for the mobile terminal, it is required to involve at least three base stations in the wireless mobile communication network, and to construct two hyperbolic equations, i.e. Math Figure 1. In the mobile terminal positioning process, the two base stations relatively near the mobile terminal and the serving base station need to communicate with each other, i.e. the base stations relatively far from each other need to communicate therebetween in the wireless mobile communication network, thus increasing communication overhead.

Further, in the case that the serving base station and the two base stations relatively near the mobile terminal use the first method to obtain the transmission time of the uplink ranging signal between the mobile terminal and themselves respectively, due to the fact that the power control of the wireless mobile communication network may result in small emission power of the uplink ranging signal sent from the mobile terminal nearest to the serving base station, the power of the uplink ranging signal received by the two base stations relatively near the mobile terminal is caused very small, i.e. the hearability of the two relatively-near base stations is poor, therefore leading to a larger measurement error in measuring the required transmission time of the uplink ranging signal, which finally leads to inaccurate mobile terminal positioning and decreased positioning accuracy of mobile terminal positioning.

Solution to Problem

In view of the above, the present invention provides a method for positioning a mobile terminal, which, in mobile terminal positioning, can reduce communication overhead and increase the positioning accuracy of mobile terminal positioning.

The present invention further provides a system for positioning a mobile terminal, which, in mobile terminal positioning, can reduce communication overhead and increase the positioning accuracy of mobile terminal positioning.

The present invention further provides a device for positioning a mobile terminal, which, in mobile terminal positioning, can reduce communication overhead and increase the positioning accuracy of mobile terminal positioning.

In order to achieve the above objects, the technical solutions of the embodiments of the present invention are implemented as follows.

A method for positioning a mobile terminal, which includes: instructing, by a serving base station or an upper level relay, measuring a transmission time of a positioning signal with the mobile terminal, and instructing two relays in a serving cell to measure the transmission time of the positioning signal with the mobile terminal; and calculating, by the serving base station or the upper level relay, a position of the mobile terminal according to the transmission time of the positioning signal, the position of the serving base station or the upper level relay and the position of the two relays.

A system for positioning a mobile terminal, which includes: the mobile terminal, two relays in a serving cell, and a serving base station or an upper level relay, where the serving base station or the upper level relay is adapted to instruct measuring a transmission time of a positioning signal with the mobile terminal, to instruct the two relays to measure the transmission time of the positioning signal with the mobile terminal, and to obtain the transmission time of the positioning signal respectively between itself as well as the two relays and the mobile terminal; and to obtain a position of the mobile terminal by performing calculation according to the obtained transmission time of the positioning signal, the position of the serving base station or the upper level relay and the position of the two relays; the two relays are adapted to measure the transmission time of the positioning signal with the mobile terminal according to the instruction from the serving base station or the upper level relay; and the mobile terminal is adapted to measure the transmission time of the positioning signal with the serving base station or the upper level relay and the two relays respectively according to the instruction from the serving base station or the upper level relay.

A relay for positioning a mobile terminal, which includes: a positioning unit and a transceiver unit, where the transceiver unit is adapted to receive an instruction from a serving base station or an upper level relay, and to send the same to the positioning unit; and the positioning unit is adapted to measure a transmission time of a positioning signal with the mobile terminal according to the instruction from the serving base station or the upper level relay.

Advantageous Effects of Invention

As can be seen from the above technical solutions, in the present invention, the mobile terminal positioning is implemented using the TDOA method where the relay assists the serving base station or the upper level relay, i.e. in the mobile terminal positioning, the serving base station or the upper level relay obtains the transmission time of the positioning signal between the serving base station or the upper level relay and the mobile terminal as well as between the two relays and the mobile terminal respectively. Then, the serving base station or the upper level relay obtains the position of the mobile terminal by performing calculation according to the obtained transmission time of the three positioning signals, the position of the serving base station or the upper level relay and the position of the two relays. According to the present invention, in the mobile terminal positioning process, there is no need for the three base stations relatively far from each other to communicate with each other as in the prior art, instead only the communication between the relatively-near base station and the two relays in the serving cell is required, thus reducing communication overhead. During the process that the serving base station or the upper level relay obtains the transmission time of the positioning signal between the serving base station or the upper level relay and the mobile terminal as well as between the two relays and the mobile terminal, the two relays are both in the serving cell of the mobile terminal, which are thus relatively close to the mobile terminal, therefore the problem that the small power of the uplink ranging signal emitted from the mobile terminal causes a large measurement error in measuring the required transmission time for receiving the uplink ranging signal by the two relays, which further leads to a large error in the transmission time of the positioning signal between the two relays and the mobile terminal obtained by the serving base station or the upper level relay, and finally leads to low positioning accuracy of mobile terminal positioning, can be avoided, thus improving the final positioning accuracy of mobile terminal positioning. Therefore, the method, system and device provided by the present invention reduce communication overhead in mobile terminal positioning, and improve the positioning accuracy of mobile terminal positioning.

MODE FOR THE INVENTION

To make the objects, technical solutions and advantages of the present invention more apparent, the present invention is described in more detail hereinbelow with reference to the accompanying drawings and the embodiments.

Along with the development of the wireless mobile communication network techniques, in order to improve the signal transmission rate and the communication quality of the mobile terminal, besides the serving base station, multiple relays are further configured in the serving cell of the mobile terminal. The multiple relays are typically configured in the edge area of the serving cell and the area with intensive mobile terminal communication, and are used for providing communication connection for the mobile terminal located in the edge area of the serving cell and the area with intensive mobile terminal communication. Thus, the mobile terminal located in the edge area of the serving cell and the area with intensive mobile terminal communication may connect communication to the serving base station or the upper level relay via the relay, which can acquire a good communication quality and increase the transmission rate of a communication signal even using a very small emission power.

Therefore, the present invention makes use of the relay of the serving cell, implements mobile terminal positioning based on the TDOA method where the relay assists the serving base station or the upper level relay, such a mobile terminal positioning method can solve the problem of the prior art that the small power of the uplink ranging signal emitted from the mobile terminal causes a large measurement error in measuring the transmission time for receiving the uplink ranging signal by the two bases stations relatively near the mobile terminal, which finally leads to low positioning accuracy of the mobile terminal positioning, thus improving the positioning accuracy of mobile terminal positioning. Moreover, in the mobile terminal positioning process, there is no need for the base stations relatively far from each other to communicate with each other, instead only the communication between the relatively-near base station or upper level relay and the relay in the serving cell is required, thus reducing communication overhead.

In the present invention, the upper level relay is a kind of relay that may process the signal sent from another relay and control the operation of another relay.

Figure 1:
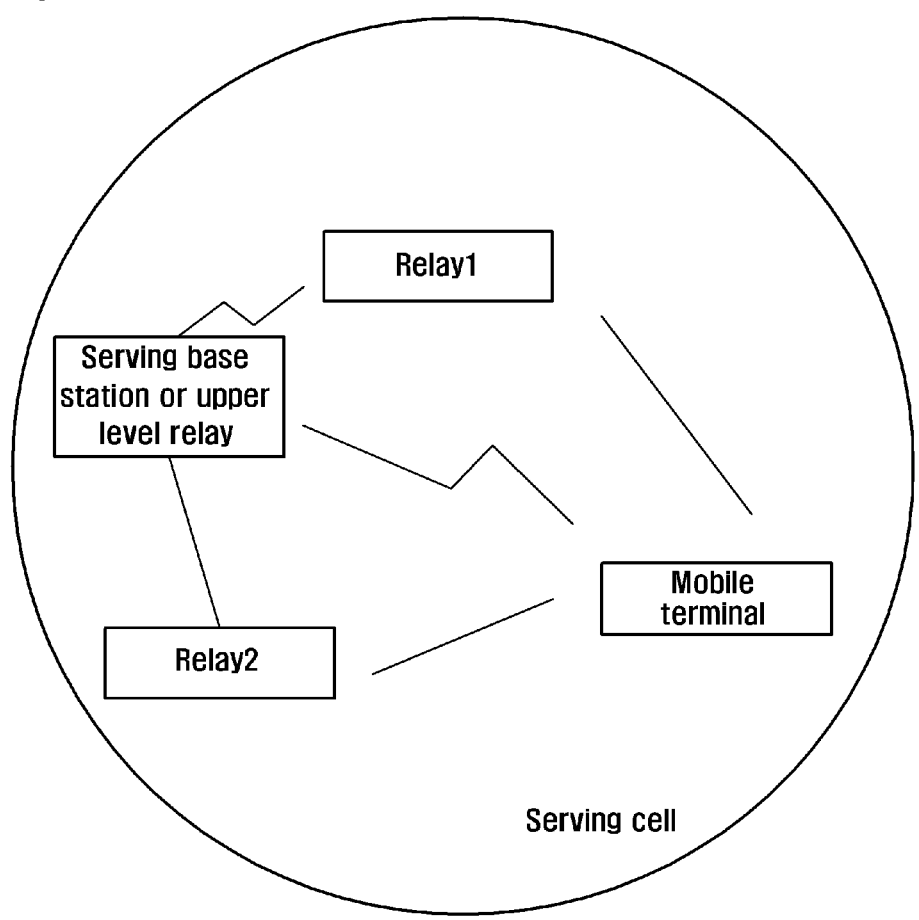
FIG. 1 is a schematic diagram illustrating a system for positioning a mobile terminal according to an embodiment of the present invention.

FIG. 1 is a schematic diagram illustrating a system for positioning a mobile terminal according to an embodiment of the present invention. The serving cell of the mobile terminal at least includes: the mobile terminal, the serving base station or the upper level relay, and two relays, which are specifically as follows.

The serving base station or the upper level relay is adapted to receive a positioning request, to instruct measuring a transmission time of a positioning signal with the mobile terminal, to instruct the two relays to measure the transmission time of the positioning signal with the mobile terminal, and to obtain the transmission time of the positioning signal respectively between itself as well as the two relays and the mobile terminal; and to obtain a position of the mobile terminal by performing calculation according to the obtained transmission time of the three positioning signals, the position of the serving base station or the upper level relay and the position of the two relays.

The two relays is adapted to measure the transmission time of the positioning signal with the mobile terminal according to the instruction from the serving base station or the upper level relay.

The mobile terminal is adapted to measure the transmission time of the positioning signal with the serving base station or the upper level relay and the two relays respectively according to the instruction from the serving base station or the upper level relay.

In the embodiment of the present invention, the positioning request may be sent from the mobile terminal to be positioned, sent from another mobile terminal in the wireless communication network via the network side of the wireless communication network, or sent from the network side of the wireless communication network. The identifier of the mobile terminal to be positioned is carried in the positioning request for determining the mobile terminal to be positioned.

In the embodiment of the present invention, there are two manners for measuring the transmission time of the positioning signal between the serving base station or the upper level relay as well as the two relays and the mobile terminal, so that the serving base station or the upper level relay obtains the transmission time of the positioning signal respectively between itself as well as the two relays and the mobile terminal.

The first manner is a manner of measuring the transmission time of an uplink ranging signal.

The serving base station or the upper level relay allocates an uplink resource for the mobile terminal, sends a measurement notification message to the two relays, and meanwhile instructs the mobile terminal to send the uplink ranging signal over the allocated uplink resource. The serving base station or the upper level relay and the two relays receive the uplink ranging signal sent from the mobile terminal in the uplink respectively, and obtain the transmission time of the uplink ranging signal by performing measurement. The two relays then send the transmission time of the uplink ranging signal obtained by performing measurement to the serving base station or the upper level relay.

The second manner is a manner of measuring the transmission time of a downlink positioning signal.

The serving base station or the upper level relay allocates a downlink resource for the two relays and sends a measurement notification message to the two relays. The serving base station or the upper level relay and the two relays send the downlink positioning signal to the mobile terminal respectively. The mobile terminal receives the three downlink positioning signals in the downlink respectively, measures the required transmission time, and then sends the transmission time of the three downlink positioning signals obtained by performing measurement, or a difference in the transmission time of the downlink positioning signal respectively between each of the two relays and the serving base station or the upper level relay, to the serving base station or the upper level relay.

Figure 2:
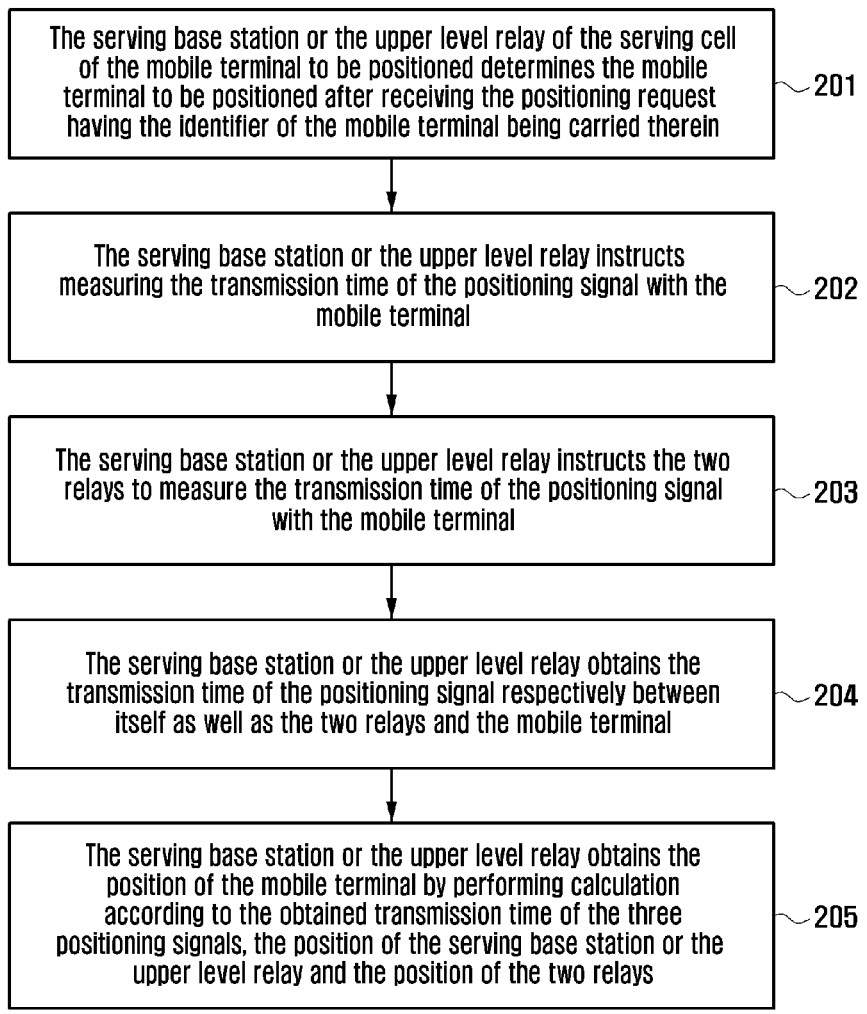
FIG. 2 is a schematic diagram illustrating a method for positioning a mobile terminal according to an embodiment of the present invention.

In the embodiment of the present invention, the serving base station or the upper level relay obtains the position of the mobile terminal by performing calculation according to the obtained transmission time of the three positioning signals, the position of the serving base station or the upper level relay and the position of the two relays using Math Figure 2:

MathFigure 2

$$\begin{cases} \left(\sqrt{(x_0-x_2)^2+(y_0-y_2)^2} - \sqrt{(x_0-x_1)^2+(y_0-y_1)^2}\right)^2 = R_{21}^2 \\ \left(\sqrt{(x_0-x_3)^2+(y_0-y_3)^2} - \sqrt{(x_0-x_1)^2+(y_0-y_1)^2}\right)^2 = R_{31}^2 \end{cases}$$ [Math. 2]

Specifically, coordinates of the position of the mobile terminal are (x0, y0), the coordinates of the position of the serving base station or the upper level relay are (x1, y1), and the coordinates of the position of the two relays are (x2, y2) and (x3, y3) respectively.

$R_{21} = c \times t_{21}$ and $R_{31} = c \times t_{31}$, where c is a propagation velocity of an uplink signal in air, t21 represents a difference in the transmission time of the positioning signal between one of the relays and the serving base station or the upper level relay, and t31 represents the difference in the transmission time of the positioning signal between the other relay and the serving base station or the upper level relay.

FIG. 2 is a schematic diagram illustrating a method for positioning a mobile terminal according to an embodiment of the present invention. The specific steps are as follows.

Step 201: The serving base station or the upper level relay of the serving cell of the mobile terminal to be positioned determines the mobile terminal to be positioned after receiving the positioning request having the identifier of the mobile terminal being carried therein.

Step 202: The serving base station or the upper level relay instructs measuring the transmission time of the positioning signal with the mobile terminal.

Step 203: The serving base station or the upper level relay instructs the two relays to measure the transmission time of the positioning signal with the mobile terminal.

Step 204: The serving base station or the upper level relay obtains the transmission time of the positioning signal respectively between itself as well as the two relays and the mobile terminal.

Step 205: The serving base station or the upper level relay obtains the position of the mobile terminal by performing calculation according to the obtained transmission time of the three positioning signals, the position of the serving base station or the upper level relay and the position of the two relays.

In this step, the serving base station or the upper level relay uses Math Figure 2 to implement positioning for the mobile terminal.

In the process as illustrated in FIG. 2, the solutions of Step 202, Step 203 and Step 204 may be implemented in the manner of measuring the transmission time of the uplink ranging signal or in the manner of measuring the transmission time of the downlink positioning signal.

There are two operation modes for the relay in the serving cell, one of which is a transparent mode, and the other is a non-transparent mode. Thus in the present invention, there are also two methods for implementing mobile terminal positioning using the TDOA method where the relay assists the serving base station or the upper level relay. They are respectively described in the following.

The first method implements mobile terminal positioning using the TDOA method where the transparent-mode relay assists the serving base station or the upper level relay.

No preamble sequence is carried in the system frame transmitted by the transparent-mode relay. The preamble sequence may be used to indicate the timeslot for sending the positioning signal, and is used in measuring the transmission time of the positioning signal.

Such a method is further divided into two approaches, which are respectively as follows: the approach where the transmission time of the positioning signal is measured in the manner of measuring the transmission time of the uplink ranging signal to implement the mobile terminal positioning; and the approach where the transmission time of the positioning signal is measured in the manner of measuring the transmission time of the downlink positioning signal to implement the mobile terminal positioning. They are respectively described in detail in the following.

Figure 3:
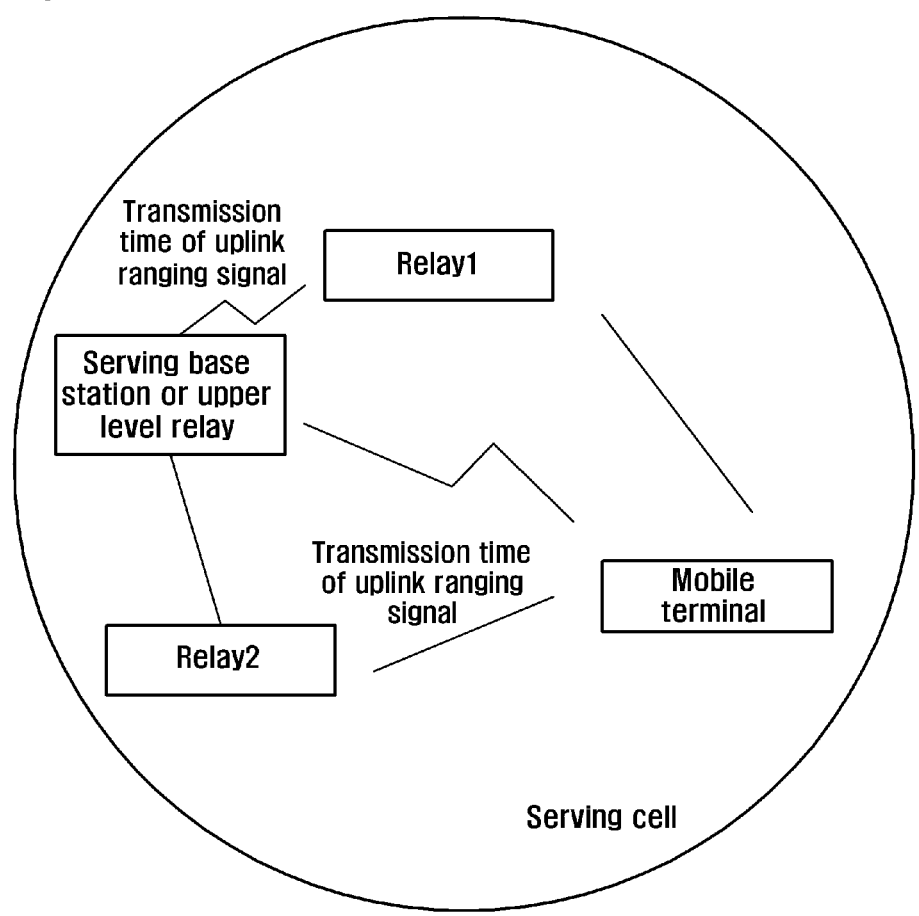
FIG. 3 is a schematic diagram illustrating the system for positioning a mobile terminal using a manner of measuring a transmission time of an uplink ranging signal according to an embodiment of the present invention.

FIG. 3 is a schematic diagram illustrating the system for positioning a mobile terminal using a manner of measuring a transmission time of an uplink ranging signal according to an embodiment of the present invention. The system includes: the serving base station or the upper level relay, the two relays, and the mobile terminal, which are specifically as follows.

The serving base station or the upper level relay is adapted to receive a positioning request, to send a measurement notification message to the two relays, to obtain the transmission time by performing measurement when receiving the uplink ranging signal sent from the mobile terminal, and to receive the transmission time of the uplink ranging signal sent from the two relays; and to calculate a position of the mobile terminal by performing calculation according to the obtained transmission time of the three positioning signals, the position of the serving base station or the upper level relay and the position of the two relays.

The two relays is adapted to obtain the transmission time by performing measurement when receiving the uplink ranging signal sent from the mobile terminal after receiving the measurement notification message from the serving base station or the upper level relay, and to send the obtained transmission time of the uplink ranging signal to the serving base station or the upper level relay.

The mobile terminal is adapted to send the uplink ranging signal.

In the system, the serving base station or the upper level relay allocates the resource for sending the uplink ranging signal for the mobile terminal before sending the measurement notification message to the two single-hop relays. The uplink resource allocated for the mobile terminal is also carried in the measurement notification message, so that the relay is notified to receive the uplink ranging signal sent from the mobile terminal in the uplink according to such uplink resource.

Figure 4:
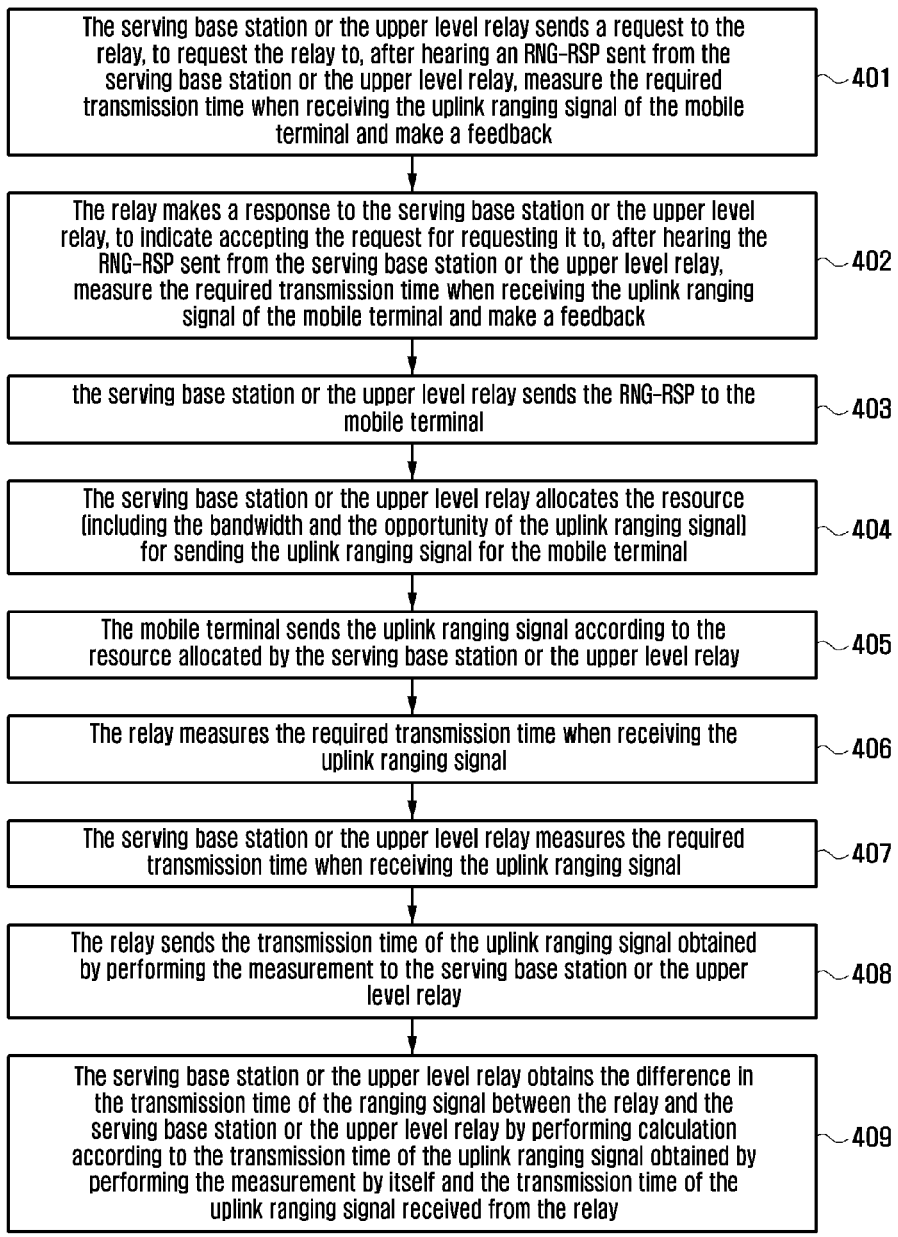
FIG. 4 is a schematic diagram illustrating the method for positioning a mobile terminal where a relay measures the transmission time of a positioning signal using the manner of measuring the transmission time of the uplink ranging signal according to an embodiment of the present invention.

FIG. 4 is a schematic diagram illustrating the method for positioning a mobile terminal where a relay measures the transmission time of a positioning signal using the manner of measuring the transmission time of the uplink ranging signal according to an embodiment of the present invention. The specific steps are as follows.

Step 401: The serving base station or the upper level relay sends a request to the relay, to request the relay to, after hearing a ranging response (RNG-RSP) sent from the serving base station or the upper level relay, measure the required transmission time when receiving the uplink ranging signal of the mobile terminal and feed back the same to the serving base station or the upper level relay.

Step 402: The relay makes a response to the serving base station or the upper level relay, to indicate accepting the request for requesting it to, after hearing the RNG-RSP sent from the serving base station or the upper level relay, measuring the required transmission time when receiving the uplink ranging signal of the mobile terminal and feed back the same to the serving base station or the upper level relay.

Step 403: the serving base station or the upper level relay sends the RNG-RSP to the mobile terminal.

In this step, information for indicating how the mobile terminal sends the uplink ranging signal, which includes a status parameter, indicated as continuous; the time interval (Rendezvous time) between sending the uplink ranging signal and receiving the RNG-RSP signal; the serial number of the orthogonal code of the uplink ranging signal; and the offset of the sending opportunity (TX opportunity offset) of the uplink ranging signal, is carried in the RNG-RSP. In other words, the RNG-RSP determines the information for sending the uplink ranging signal.

In this step, the relay hears the RNG-RSP signal.

Step 404: The serving base station or the upper level relay allocates the resource (including the bandwidth and the sending opportunity of the uplink ranging signal) for sending the uplink ranging signal for the mobile terminal.

Step 405: The mobile terminal sends the uplink ranging signal according to the resource allocated by the serving base station or the upper level relay.

Step 406: The relay measures the required transmission time when receiving the uplink ranging signal.

Step 407: The serving base station or the upper level relay measures the required transmission time when receiving the uplink ranging signal.

Step 408: The relay sends the transmission time of the uplink ranging signal obtained by performing the measurement to the serving base station or the upper level relay.

Step 409: The serving base station or the upper level relay obtains the difference in the transmission time of the ranging signal between the relay and the serving base station or the upper level relay by performing calculation according to the transmission time of the uplink ranging signal obtained by performing the measurement by itself and the transmission time of the uplink ranging signal received from the relay.

According to the same principle as illustrated in FIG. 4, the serving base station or the upper level relay may further calculate the difference in the transmission time of the uplink ranging signal with the other relay. Then, using Math Figure 2, the serving base station or the upper level relay implements the mobile terminal positioning.

In that the preamble sequence cannot be carried in the system frame transmitted by the transparent-mode relay, i.e. the uplink reception timeslot cannot be notified in the downlink, the uplink ranging signal sent from the mobile terminal cannot be received. Therefore, in FIG. 4, it is required to reconfigure the system frame transmitted by the relay, the serving base station or the upper level relay, and the mobile terminal.

Figure 5:
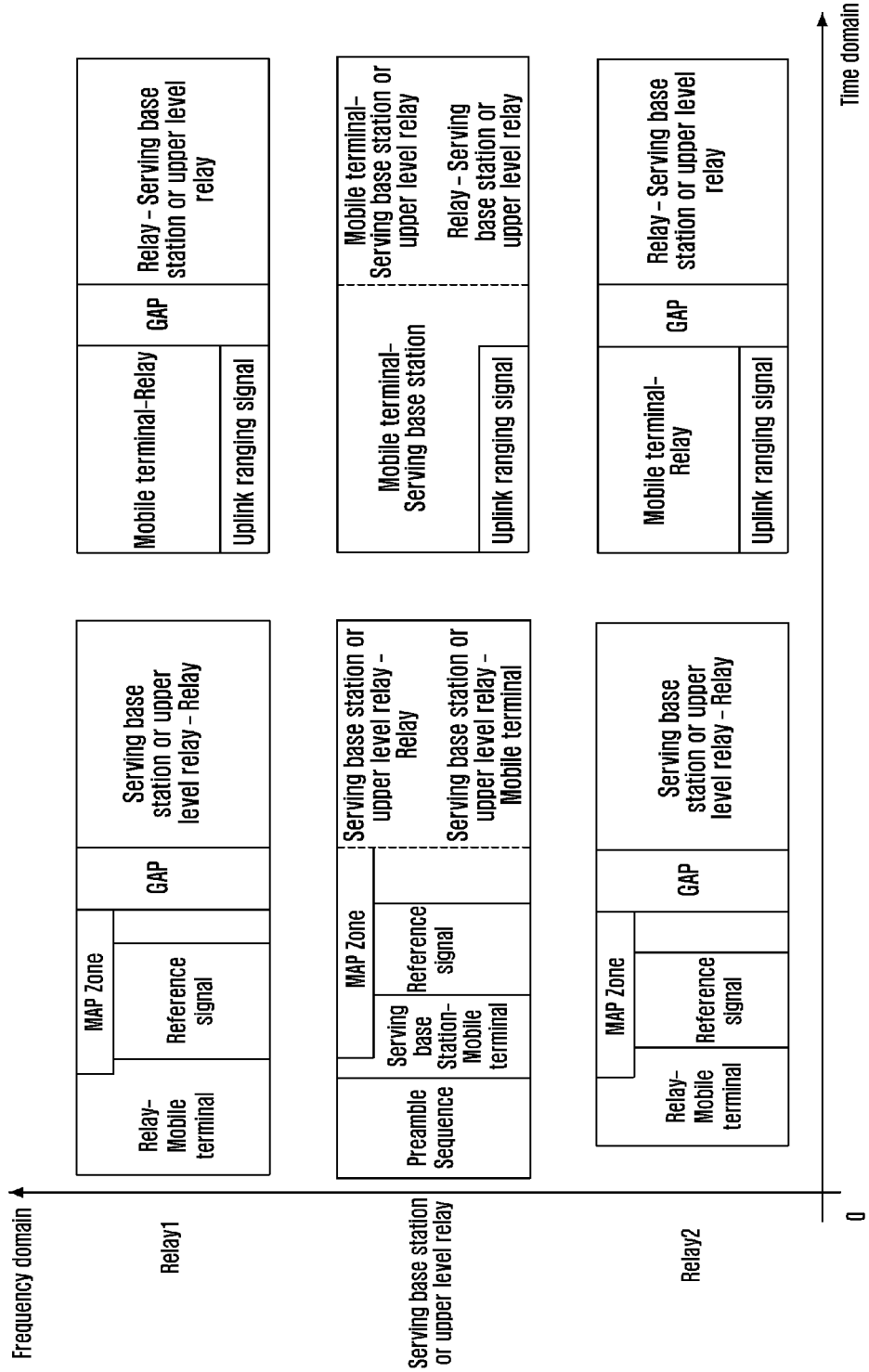
FIG. 5 is a schematic diagram illustrating a first embodiment of a system frame transmitted by the relay, a serving base station or an upper level relay, and the mobile terminal.

FIG. 5 is a schematic diagram illustrating a first embodiment of a system frame transmitted by the relay, a serving base station or an upper level relay, and the mobile terminal. Specifically, the x axis represents the time domain, and the y axis represents the frequency domain. The system frame transmitted by the relay, the serving base station or the upper level relay, and the mobile terminal is arranged from the top to the bottom. As can be seen, the serving base station or the upper level relay sends the reference signal (ERS) after sending the preamble sequence in the downlink. The relay sends the ERS in the downlink. The ERS sent from the relay in the downlink and the ERS sent from the serving base station or the upper level relay in the downlink is aligned with each other, so as to indicate the reception timeslot thereof in the uplink. The mobile terminal receives the ERS and the preamble sent from the serving base station or the upper level relay in the downlink and the ERS sent from the relay, and performs parsing to obtain the uplink timeslot for sending the uplink ranging signal. The mobile terminal sends the uplink ranging signal in the determined uplink timeslot, and the relay and the serving base station or the upper level relay receive the uplink ranging signal in the uplink and measure the required transmission time.

Figure 6:
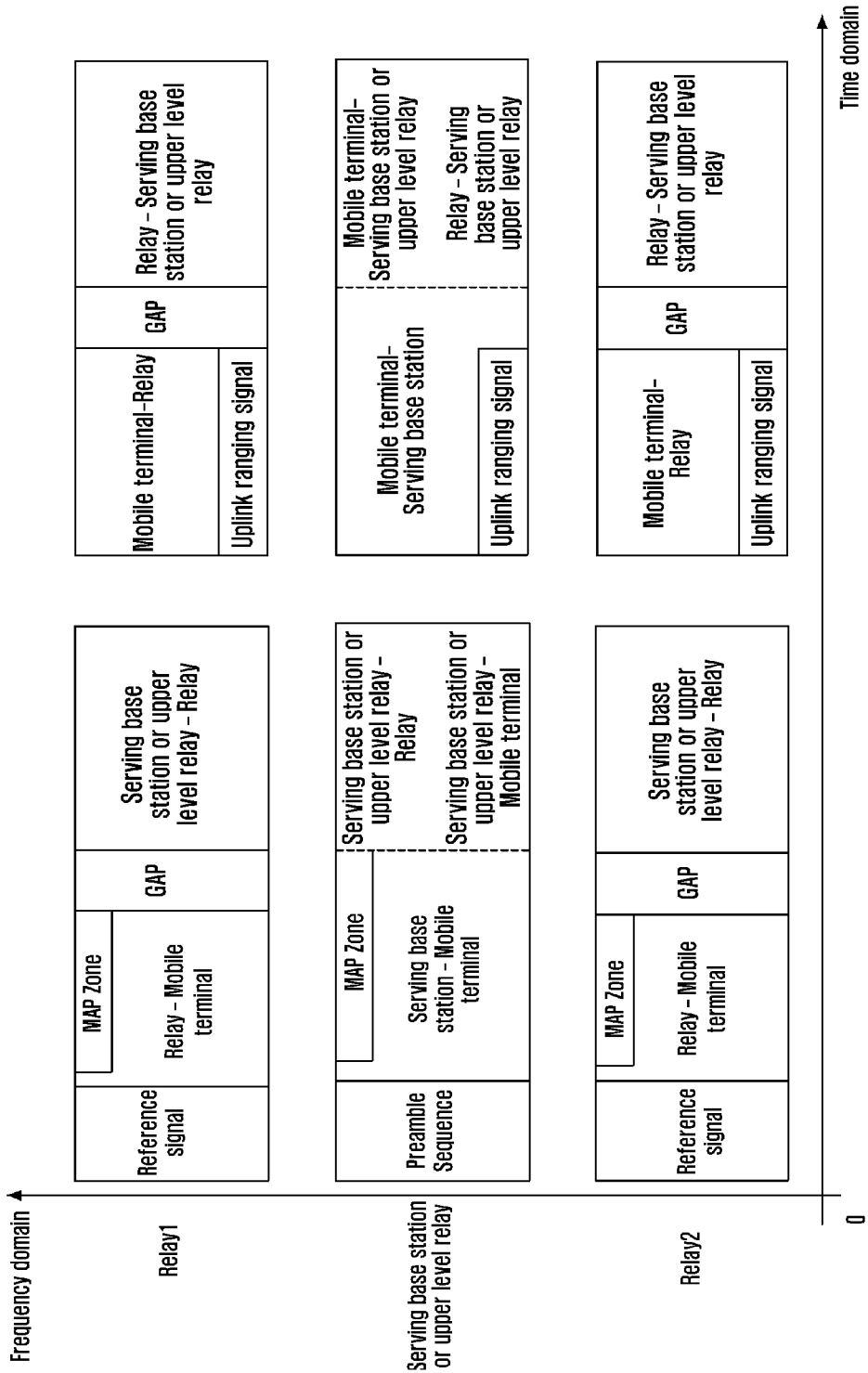
FIG. 6 is a schematic diagram illustrating a second embodiment of the system frame transmitted by the relay, the serving base station or the upper level relay, and the mobile terminal.

Of course, the system frame of the relay, the serving base station or the upper level relay, and the mobile terminal may alternatively be as illustrated in FIG. 6. FIG. 6 is a schematic diagram illustrating a second embodiment of the system frame transmitted by the relay, the serving base station or the upper level relay, and the mobile terminal. Specifically, the x axis represents the time domain, and the y axis represents the frequency domain. The system frame transmitted by the relay, the serving base station or the upper level relay, and the mobile terminal is arranged from the top to the bottom. As can be seen, the serving base station or the upper level relay sends the preamble for indicating the uplink timeslot for sending the uplink ranging signal. The relay sends the ERS in the downlink. The ERS sent from the relay in the downlink and the preamble sent from the serving base station or the upper level relay in the downlink is aligned with each other, so as to indicate the uplink timeslot for receiving the uplink ranging signal in the uplink. The mobile terminal receives the ERS and the preamble sent from the serving base station or the upper level relay in the downlink and the ERS sent from the relay, and performs parsing to obtain the uplink timeslot for sending the uplink ranging signal. The mobile terminal sends the uplink ranging signal in the determined uplink timeslot, and the relay and the serving base station or the upper level relay receive the uplink ranging signal in the uplink and measure the required transmission time.

In the system frame as illustrated in FIG. 5 or FIG. 6, the downlink system frame sent from the serving base station or the upper level relay to the mobile terminal may be the RNG-RSP of FIG. 4.

Figure 7:
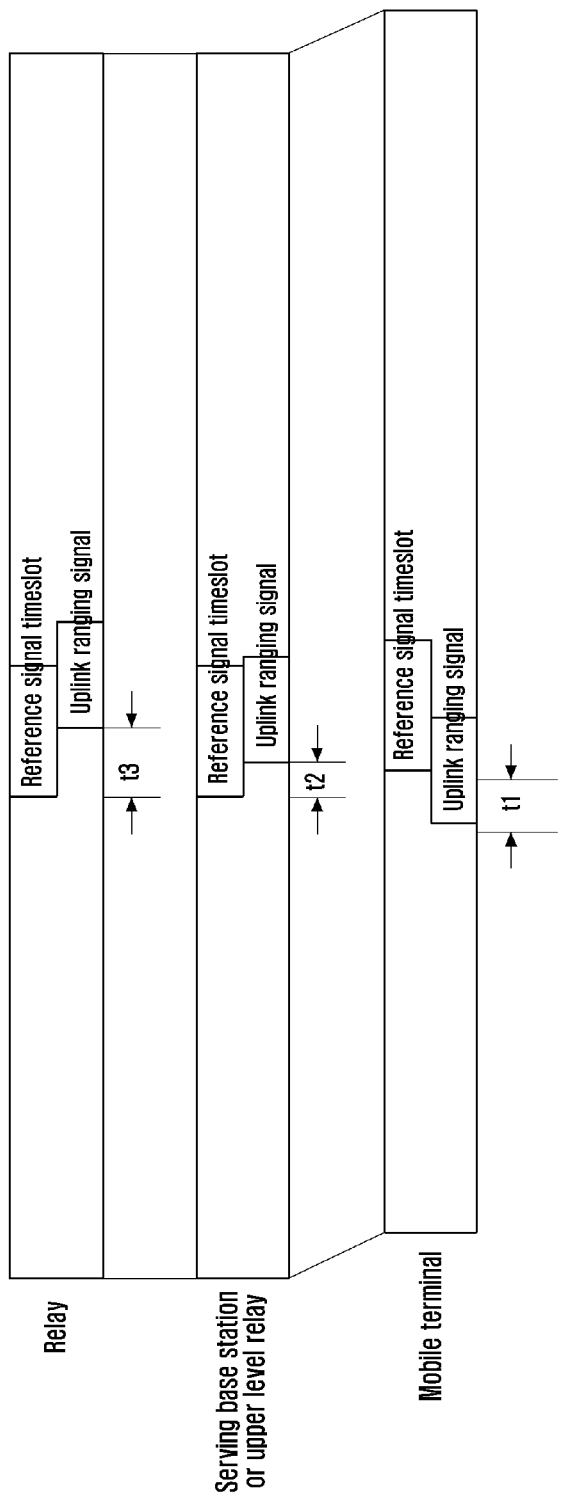
FIG. 7 is a sequence chart illustrating an uplink system frame transmitted by the relay, the serving base station or the upper level relay and the mobile terminal.

In that there is a time delay for the system frame transmitted between the mobile terminal and the serving base station or the upper level relay as well as the relay, there is also a time delay for the downlink system frame received by the mobile terminal sent from the serving base station or the upper level relay and the relay. Therefore, the mobile terminal may advance a predetermined time to send the uplink ranging signal, where the predetermined time may be carried in the RNG-RSP sent from the serving base station or the upper level relay. Thus, the time that the uplink ranging signal reaches the serving base station or the upper level relay and the relay may differ a little from the start point of the uplink reception timeslot indicated in the ERS. The sequence chart is as illustrated in FIG. 7. In FIG. 7, there is respectively a propagation time delay between the downlink system frame received by the mobile terminal and the downlink system frame sent from the mobile terminal. The mobile terminal advances a predetermined time t1 relative to the uplink reception timeslot indicated in the ERS to send the uplink ranging signal. The uplink ranging signal received on the serving base station or the upper level relay is delayed a time t2 relative to the uplink reception timeslot indicated in the ERS, which is just the transmission time of the uplink ranging signal obtained by the serving base station or the upper level relay by performing measurement. The uplink ranging signal received on the relay is delayed a time t3 relative to the uplink reception timeslot indicated in the ERS, which is just the transmission time of the uplink ranging signal obtained by the relay by performing measurement.

Figure 8:
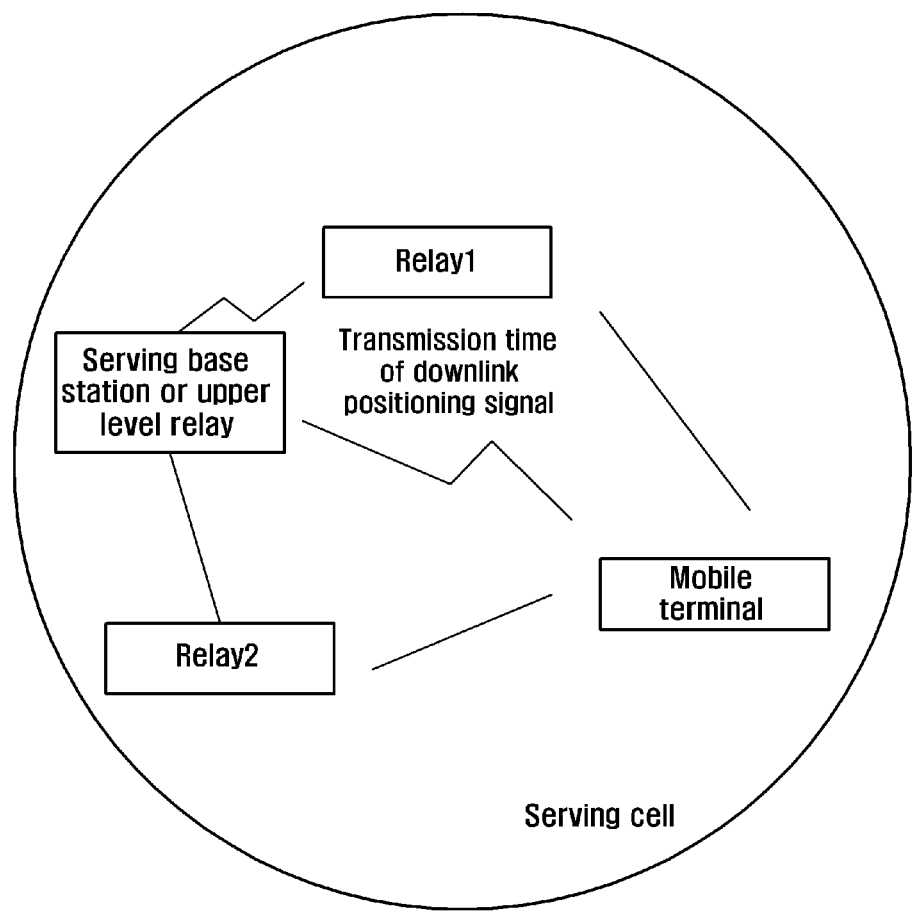
FIG. 8 is a schematic diagram illustrating the system for positioning a mobile terminal using a manner of measuring a transmission time of a downlink positioning signal according to an embodiment of the present invention.

FIG. 8 is a schematic diagram illustrating the system for positioning a mobile terminal using a manner of measuring a transmission time of a downlink positioning signal according to an embodiment of the present invention. The system includes: the serving base station or the upper level relay, the two relays, and the mobile terminal, which are specifically as follows.

The serving base station or the upper level relay is adapted to receive a positioning request, to send a measurement notification message to the two relays, to send the downlink positioning signal to the mobile terminal, and to receive the transmission time of the downlink positioning signal sent from the mobile terminal; and to obtain a position of the mobile terminal by performing calculation according to the obtained transmission time of the three positioning signals, the position of the serving base station or the upper level relay and the position of the two relays.

The two relays are adapted to send the downlink positioning signal to the mobile terminal after receiving the measurement notification message from the serving base station or the upper level relay.

The mobile terminal is adapted to measure the required transmission time when receiving the downlink positioning signal sent respectively from the serving base station or the upper level relay and the two relays, and then send the transmission time of the downlink positioning signal obtained by performing the measurement to the serving base station or the upper level relay.

In this embodiment, the mobile terminal, after measuring the required transmission time of the downlink positioning signal, may alternatively send the difference in the transmission time of the downlink positioning signal respectively between each of the two relays and the serving base station or the upper level relay obtained by performing calculation to the serving base station or the upper level relay, so that the serving base station or the upper level relay obtains the position of the mobile terminal by performing calculation.

In that the processing capability of the mobile terminal is not as strong as the serving base station or the upper level relay, the position of the mobile terminal is finally calculated using Math Figure 2. But the present invention is not intended to exclude the situation that in the case of implementing mobile terminal positioning in the manner of measuring the transmission time of the downlink positioning signal, it may be the mobile terminal that calculates the position of the mobile terminal using Math Figure 2 and then reports the same to the serving base station or the upper level relay.

In this embodiment, the preamble sequence cannot be carried in the system frame transmitted by the transparent-mode relay, i.e. the downlink positioning signal cannot be sent in the downlink, thus the mobile terminal cannot measure the transmission time of the downlink positioning signal.

Therefore, it is proposed in the present invention two approaches to address this problem.

Figure 9:
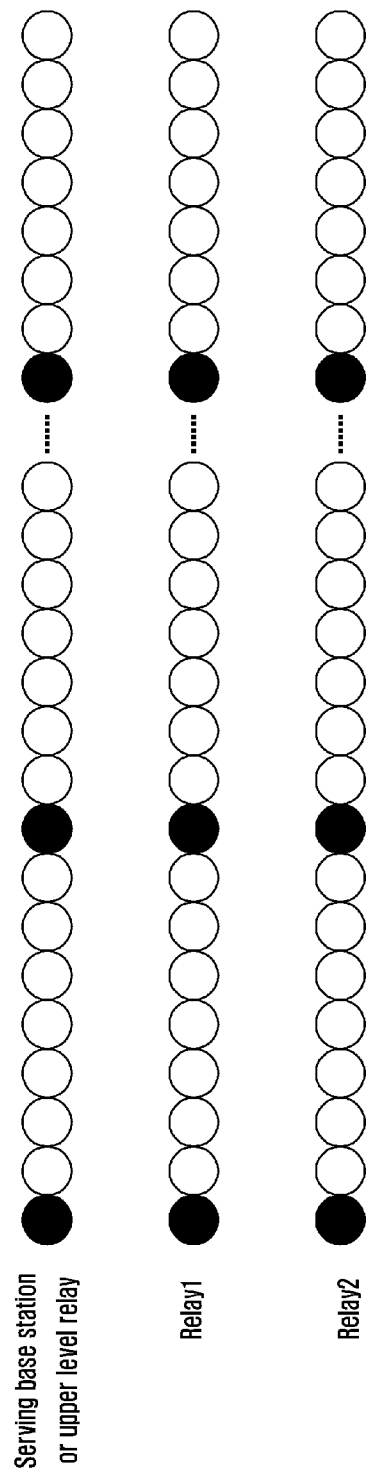
FIG. 9 is a schematic diagram illustrating an orthogonal sequence of the serving base station or the upper level relay and the relay.

According to one approach, an orthogonal sequence is inserted into the downlink system frame of the relay and the serving base station or the upper level relay. The orthogonal sequence includes a training sequence and a reference sequence, and is used for sending the downlink positioning signal to the mobile terminal. FIG. 9 is a schematic diagram illustrating an orthogonal sequence of the serving base station or the upper level relay and the relay. Specifically, each circle represents an emission antenna, and the solid circle represents that such emission antenna emits the orthogonal sequence. The orthogonal sequence may be compatible with multi-antenna emission, but in the present invention, to send the orthogonal sequence via merely one antenna of the serving base station or the upper level relay and the relay may already meet requirements. Therefore, an antenna may be pre-specified for sending. The specified antenna may be determined according to the current channel status of the antenna, e.g. the antenna currently with better channel condition may be selected for sending the orthogonal sequence to the mobile terminal.

According to another approach, a spread spectrum sequence being orthogonal to the preamble sequence is sent through the position of the preamble sequence (e.g. the OFDM symbol timeslot of the preamble sequence) in the downlink system frame of the relay and the serving base station or the upper level relay, for sending the downlink positioning signal to the mobile terminal. This approach may be called a trigger approach. Only when it is required to implement positioning for the mobile terminal, is this approach triggered. In this way, there is no need to insert the orthogonal sequence in the downlink system frame.

Figure 10:
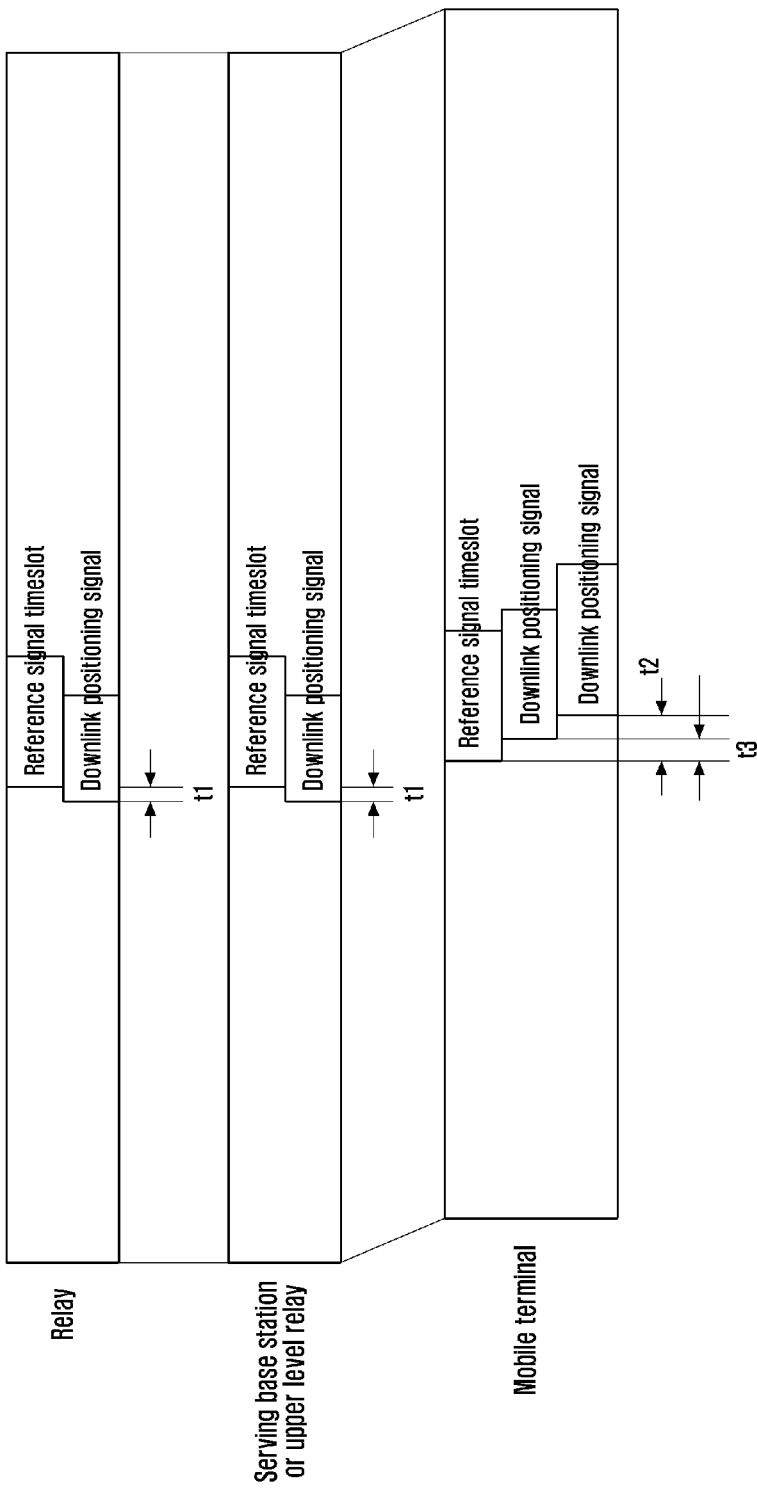
FIG. 10 a sequence chart illustrating a downlink system frame transmitted by the relay, the serving base station or the upper level relay, and the mobile terminal.

FIG. 10 a sequence chart illustrating a downlink system frame transmitted by the relay, the serving base station or the upper level relay, and the mobile terminal. As can be seen, the relay and the serving base station or the upper level relay both advance a predetermined time t1 relative to the reception downlink timeslot (the resource is preallocated and is notified to the mobile terminal) to send the downlink positioning signal. The downlink positioning signal is the inserted orthogonal sequence or the spread spectrum sequence being orthogonal to the preamble sequence. At the mobile terminal, the mobile terminal determines the downlink reception timeslot according to the instruction from the serving base station or the upper level relay, and receives the downlink positioning signal in the downlink reception timeslot. The downlink positioning signal received from the relay is delayed a timeslot t3 relative to the start of the downlink reception timeslot, which is just the required transmission time obtained by performing measurement. The downlink positioning signal received from the serving base station or the upper level relay is delayed a timeslot t2 relative to the start of the downlink reception timeslot, which is just the required transmission time obtained by performing measurement.

Figure 11:
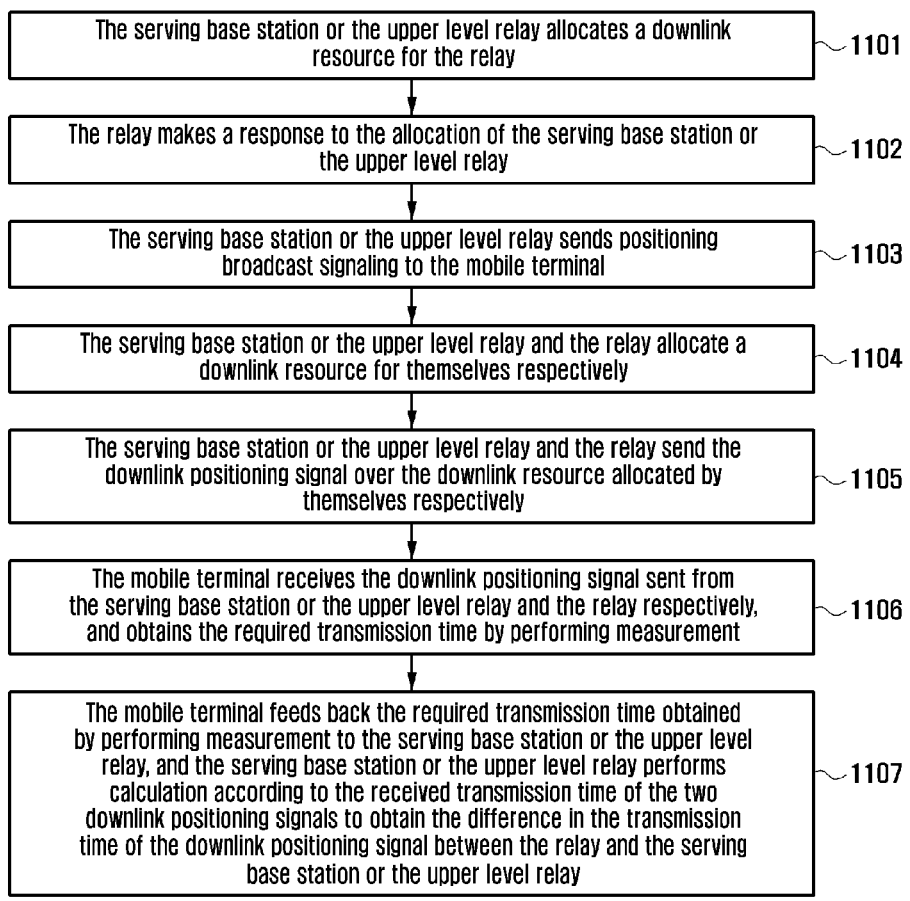
FIG. 11 is a diagram illustrating the method for positioning a mobile terminal where the relay measures the transmission time of the positioning signal using the manner of measuring the transmission time of the downlink positioning signal according to an embodiment of the present invention.

FIG. 11 is a diagram illustrating the method for positioning a mobile terminal where the relay measures the transmission time of the positioning signal using the manner of measuring the transmission time of the downlink positioning signal according to an embodiment of the present invention. The specific steps are as follows.

Step 1101: The serving base station or the upper level relay allocates a downlink resource for the relay.

In this step, the allocated downlink resource may be the downlink resource (including the downlink frame number, the symbol number, the CDMA code, the compensation for the sending opportunity, the power adjustment, and other information) allocated for the spread spectrum sequence being orthogonal to the preamble sequence or the orthogonal sequence.

Step 1102: The relay makes a response to the allocation of the serving base station or the upper level relay.

In this step, the relay makes a response to indicate accepting the allocation of the serving base station or the upper level relay.

Step 1103: The serving base station or the upper level relay sends positioning broadcast signaling to the mobile terminal.

In this step, the signaling is the resource of the spread spectrum sequence being orthogonal to the preamble sequence or the orthogonal sequence, which includes the downlink frame number, the symbol number, the CDMA code, the compensation for the sending opportunity, the power adjustment, and other information, for indicating the timeslot in which the mobile terminal receives the downlink positioning signal.

Step 1104: The serving base station or the upper level relay and the relay allocate a downlink resource for themselves respectively.

Step 1105: The serving base station or the upper level relay and the relay send the downlink positioning signal over the downlink resource allocated by themselves respectively.

The downlink positioning signal is the spread spectrum sequence being orthogonal to the preamble sequence or the orthogonal sequence.

Step 1106: The mobile terminal receives the downlink positioning signal sent from the serving base station or the upper level relay and the relay respectively, and obtains the required transmission time by performing measurement.

Step 1107: The mobile terminal feeds back the required transmission time obtained by performing measurement to the serving base station or the upper level relay, and the serving base station or the upper level relay performs calculation according to the received transmission time of the two downlink positioning signals to obtain the difference in the transmission time of the downlink positioning signal between the relay and the serving base station or the upper level relay.

In this embodiment, the mobile terminal may alternatively sends, after measuring the required transmission time of the downlink positioning signal, the difference in the downlink positioning signal respectively between each of the two relays and the serving base station or the upper level relay obtained by performing calculation to the serving base station or the upper level relay, for the serving base station or the upper level relay to perform calculation to obtain the position of the mobile terminal.

According to the same principle as illustrated in FIG. 11, the serving base station or the upper level relay may further calculate the time difference with the other relay. Then, the serving base station or the upper level relay implements mobile terminal positioning using Math Figure 2.

The second method implements mobile terminal positioning using the TDOA method where the non-transparent-mode relay assists the serving base station or the upper level relay.

Figure 12:
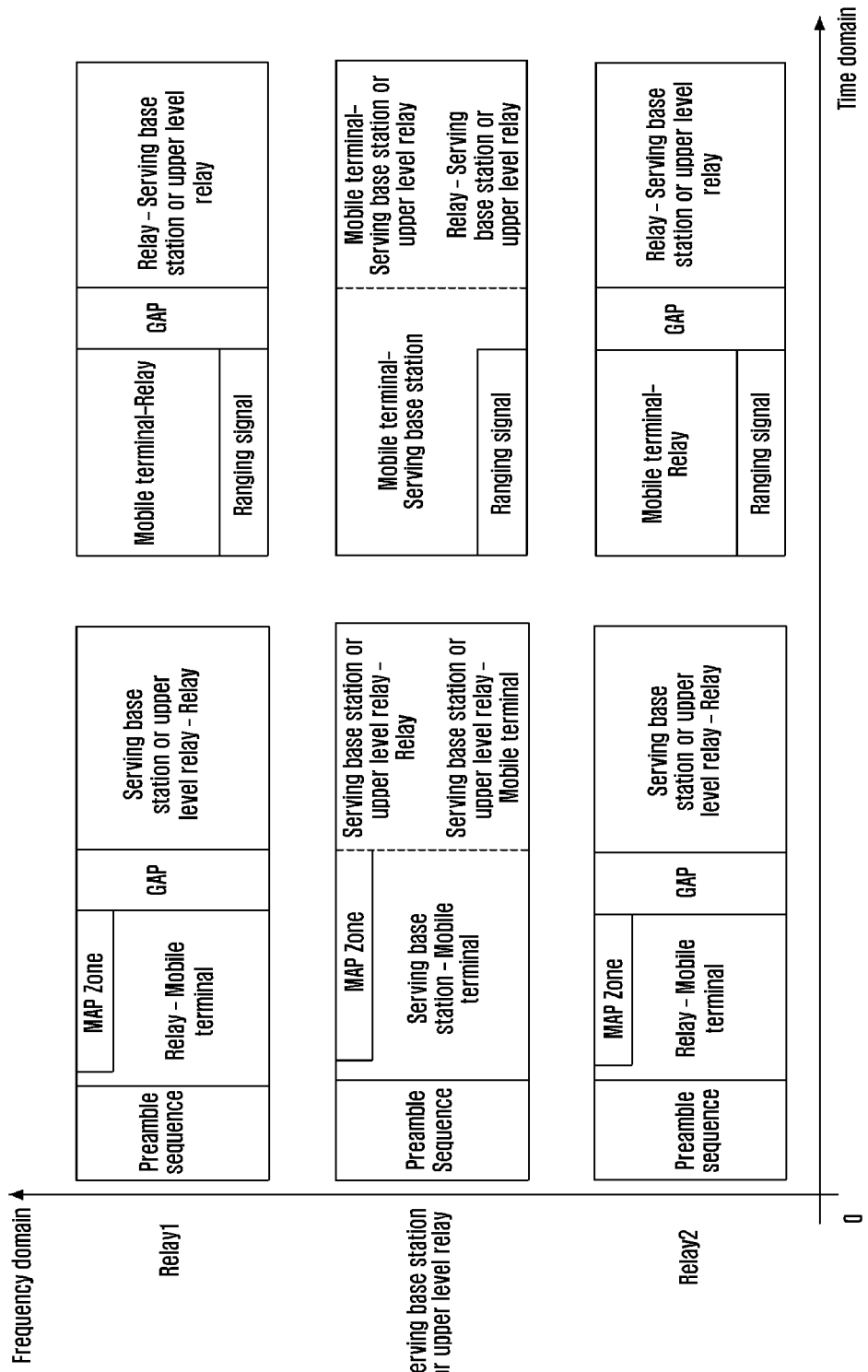
FIG. 12 is a sequence chart illustrating a system frame transmitted by a non-transparent-mode relay, the serving base station or the upper level relay, and the mobile terminal.

For the non-transparent-mode relay, the downlink preamble sequence can be sent over the downlink system frame, so as to indicate the reception timeslot of the uplink ranging signal that is sent or to send the downlink positioning signal, thus there is no need to reconfigure the downlink system frame. FIG. 12 is a sequence chart illustrating a system frame transmitted by a non-transparent-mode relay, the serving base station or the upper level relay, and the mobile terminal. As can be seen, the downlink system frames of the non-transparent-mode relay and the serving base station or the upper level relay both include the downlink preamble sequence, so as to indicate the reception timeslot of the uplink ranging signal that is sent or to send the downlink positioning signal. Thus, the mobile terminal positioning may be implemented using the method of the present invention directly. The specific method is the same as illustrated in FIG. 4 or FIG. 11, except that it is no longer required to reconfigure the system frame, thus is not repeated herein.

Figure 13:
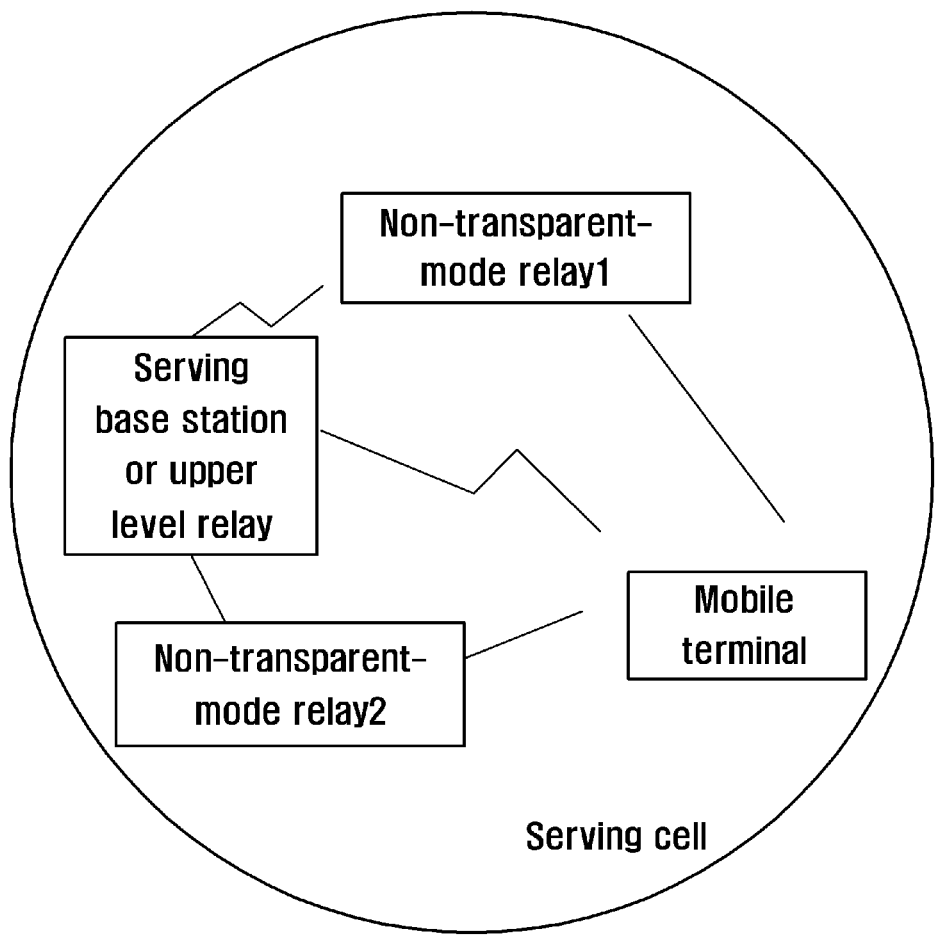
FIG. 13 is a schematic diagram illustrating the system for positioning a mobile terminal using the TDOA method where the non-transparent-mode relay assists the base station according to the present invention.

FIG. 13 is a schematic diagram illustrating the system for positioning a mobile terminal using the TDOA method where the non-transparent-mode relay assists the base station according to the present invention. The system includes the mobile terminal, the two non-transparent-mode relays, and the serving base station or the upper level relay. The interaction process of the system is the same as illustrated in FIG. 3 or FIG. 8, thus is not repeated herein.

Figure 14:
FIG. 14 is a schematic diagram illustrating a relay for positioning a mobile terminal according to an embodiment of the present invention.

In the present invention, the mobile terminal positioning requires the assistance of the relay, thus the relay of the present invention is also equipped with a mobile terminal positioning function. Therefore, the present invention further provides a relay for positioning a mobile terminal, as illustrated in FIG. 14. The relay includes a positioning unit and a transceiver unit, which are specifically as follows.

The transceiver unit is adapted to receive an instruction from a serving base station or an upper level relay, and to send the same to the positioning unit.

The positioning unit is adapted to measure a transmission time of a positioning signal with the mobile terminal according to the instruction from the serving base station or the upper level relay.

Specifically, the transceiver unit is adapted to receive a measurement notification message from the serving base station or the upper level relay and send the same to the positioning unit, and to send the obtained transmission time of the uplink ranging signal to the serving base station or the upper level relay.

The positioning unit is adapted to obtain the transmission time by measurement when receiving the uplink ranging signal sent from the mobile terminal, and to send the obtained transmission time of the uplink ranging signal to the transceiver unit.

Alternatively, the transceiver unit is adapted to receive a measurement notification message from the serving base station or the upper level relay and send the same to the positioning unit, and to send the downlink positioning signal to the mobile terminal according to an instruction from the positioning unit.

The positioning unit is adapted to instruct the transceiver unit to send the downlink positioning signal to the mobile terminal after receiving the measurement notification message sent from the transceiver unit.

In the present invention, the serving base station or the upper level relay may be replaced by the upper level relay of the relay. At this time, the upper level relay acts as the serving base station or the upper level relay, and completes the mobile terminal positioning in the assistance of the relay according to the instruction from the wireless mobile communication network side.

Figure 15:
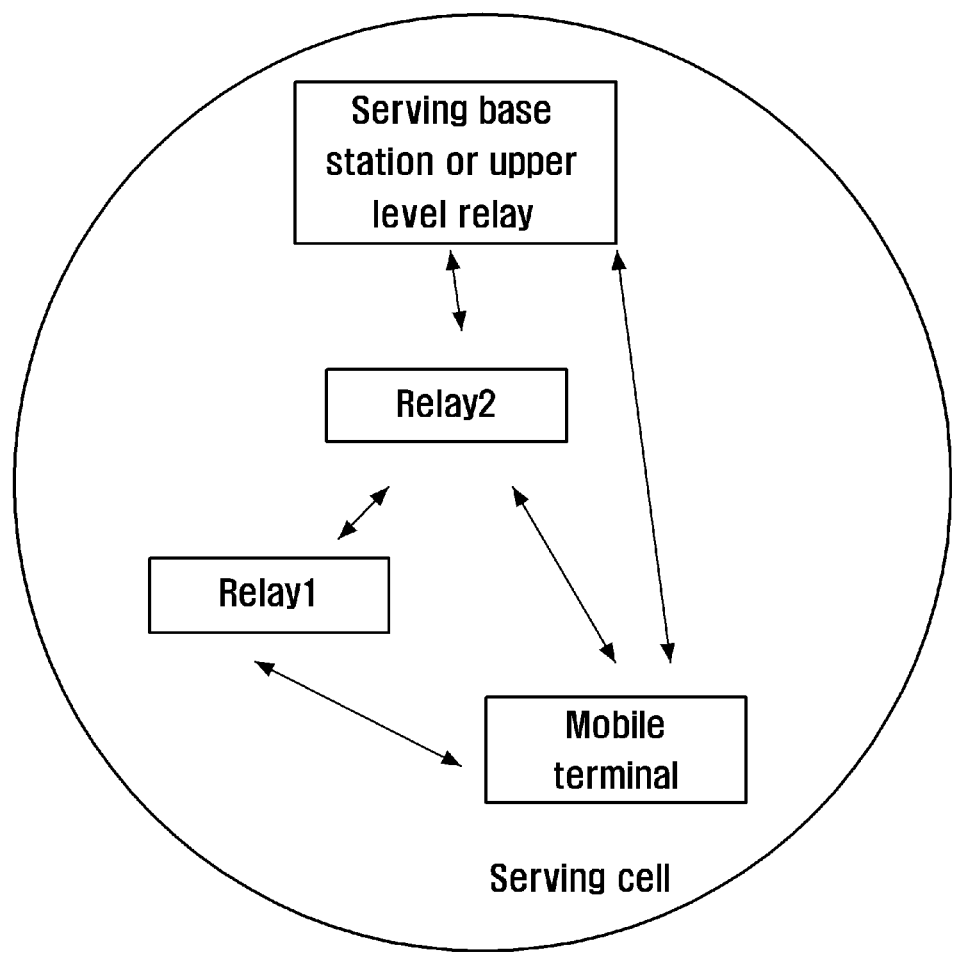
FIG. 15 is a schematic diagram illustrating a communication system of the serving base station or the upper level relay and the relay in a 16m system standard according to the present invention.

Moreover, it is specified in the 802.16m protocol document that compatibility with the relay is required. In addition, the relay is specified in the latest description document of the 16m system standard. The communication system of the serving base station or the upper level relay and the relay is illustrated in FIG. 15. Specifically, the mobile terminal and the relay (represented as the relay 1 and the relay 2 in the figure) communicate with each other, the mobile terminal and the serving base station or the upper level relay communicate with each other, the serving base station or the upper level relay and the multi-hop relay (represented as the relay 2 in the figure) communicate with each other, the relay (represented as the relay 1 in the figure) and the multi-hop relay (represented as the relay 2 in the figure) communicate with each other, and the relay may also communicate with the serving base station or the upper level relay via the multi-hop relay. Therefore, the solutions of the present invention may be applied to a system as illustrated in FIG. 15. In other words, the present invention is applicable to the 16m system standard.

To sum up, according to the system, method and device provided by the present invention, it is proposed a solution that mobile terminal positioning is implemented by the serving base station or the upper level relay in the assistance of the relay. The hearability problem of the prior art resulted from implementing mobile terminal positioning based on service is solved. In addition, the accuracy of mobile terminal positioning is improved, and the overhead of the prior art, which is resulted from the communication between the serving base station and the mobile terminal in the case of implementing mobile terminal positioning using multiple base stations, is reduced.

The objects, technical solutions and advantages of the present invention are described in more detail hereinabove with reference to preferred embodiments. It should be understood that, the foregoing are merely the preferred embodiments of the present invention, and the scope of the present invention is not limited thereto. Any modifications, equivalents and improvements made without departing from the spirit and principle of the present invention are intended to fall into the scope of the present invention.

The invention claimed is:

1. A method for positioning a mobile terminal, comprising:
  instructing, by a serving base station or an upper level relay, a measurement of a transmission time of a positioning signal to two relays in a serving cell; and
  calculating, by the serving base station or the upper level relay, a position of the mobile terminal according to the transmission time of the positioning signal measured by at least one of the two relays, wherein instructing the measurement of the transmission time of the positioning signal comprises:
    allocating at least one of a preamble sequence and a reference signal in a downlink frame, and
    sending at least one of the preamble sequence and the reference signal having information of the resource for the positioning signal to the mobile terminal to determine a timeslot for the positioning signal in the mobile terminal.

2. The method according to claim 1, further comprising:
  receiving a positioning request having an identifier of the mobile terminal; and
  determining the mobile terminal to be positioned according to the identifier.

3. The method according to claim 1, wherein the serving base station or the upper level relay is configured to calculate the position of the mobile terminal according to an obtained transmission time of the positioning signal, the position of the serving base station or the upper level relay and the position of the two relays using a Math Figure as follows:

$$\begin{cases} \left(\sqrt{(x_0-x_2)^2+(y_0-y_2)^2}-\sqrt{(x_0-x_1)^2+(y_0-y_1)^2}\right)^2 = R_{21}^2 \\ \left(\sqrt{(x_0-x_3)^2+(y_0-y_3)^2}-\sqrt{(x_0-x_1)^2+(y_0-y_1)^2}\right)^2 = R_{31}^2 \end{cases}$$

wherein coordinates of the position of the mobile terminal are (x0, y0), the coordinates of the position of the serving base station or the upper level relay are (x1, y1), and the coordinates of the position of the two relays are (x2, y2) and (x3, y3) respectively, and wherein $R_{21}=cSt_{21}$ and $R_{31}=cSt_{31}$, where c is a propagation velocity of an uplink signal in air, t21 represents a difference in the transmission time of the positioning signal between one of the relays and the serving base station or the upper level relay, and t31 represents the difference in the transmission time of the positioning signal between the other relay and the serving base station or the upper level relay.

4. The method according to claim 1, wherein instructing the measurement of the transmission time of the positioning signal comprises:
  allocating an uplink resource for the mobile terminal if the positioning signal is an uplink signal, and
  wherein calculating the position of the mobile terminal comprises:
    receiving the positioning signal over the uplink resource;
    measuring the transmission time of the positioning signal;
  receiving the transmission time of the positioning signal measured by the two relays from the two relays; and
  measuring the position of the mobile terminal according to the transmission time of the positioning signal measured by the two relays.

5. The method according to claim 4, wherein the allocating the uplink resource for the mobile terminal comprises:
  allocating the reference signal in the downlink system frame; and
  sending the reference signal having information of the uplink resource to the mobile terminal to determine a timeslot for sending the positioning signal in the mobile terminal.

6. The method according to claim 5, wherein the reference signal is sent in the timeslot of the preamble sequence of the downlink system frame.

7. The method according to claim 5, wherein receiving the positioning signal comprises:
  receiving the positioning signal in an advanced timeslot that is set with respect to the allocated downlink resource, by the mobile terminal for sending the positioning signal.

8. The method according to claim 1, wherein instructing the measurement of a transmission time of the positioning signal comprises:
- allocating a downlink resource for the serving base station or the upper level relay and the two relays if the positioning signal is a downlink signal;
- notifying the mobile terminal; and
- wherein calculating the position of the mobile terminal comprises:
- sending the positioning signal over the allocated downlink resource;
- receiving the transmission time of the positioning signal measured by the mobile terminal; and
- measuring the position of the mobile terminal according to the transmission time of the positioning signal measured by the mobile terminal.

9. The method according to claim 1, wherein instructing the measurement of the transmission time of the positioning signal comprises:
- allocating a downlink resource for the serving base station or the upper level relay and the two relays if the positioning signal is a downlink signal;
- notifying the mobile terminal; and
- wherein calculating the position of the mobile terminal comprises:
- sending the positioning signal over the allocated downlink resource,
- receiving a difference in the transmission time of the positioning signal between each of the two relays and the serving base station or the upper level relay measured by the mobile terminal, and
- measuring the position of the mobile terminal according to a difference in the transmission time of the positioning signal measured by the mobile terminal.

10. The method according to claim 8, wherein the positioning signal comprises:
- an orthogonal sequence inserted into the downlink system frame; or
- a spread spectrum sequence being orthogonal to a preamble timeslot that is inserted into a preamble sequence timeslot in a downlink system; and
- the positioning signal comprises:
  - the preamble sequence timeslot in the downlink system to determine the timeslot for receiving the positioning signal in the mobile terminal.

11. The method according to claim 8 wherein receiving the positioning signal comprises:
- receiving the positioning signal in an advanced timeslot that is set with respect to the allocated downlink resource, by the mobile terminal for sending the positioning signal.

12. A system for positioning a mobile terminal, comprising:
- the mobile terminal, two relays in a serving cell, and a serving base station or an upper level relay, wherein
- the serving base station or the upper level relay is configured to:
  - instruct a measurement of a transmission time of a positioning signal to instruct to the two relays,
  - allocate at least one of a preamble sequence and a reference signal in a downlink system frame, and send at least one of the preamble sequence and the reference signal having information of the resource for the positioning signal to the mobile terminal to determine a timeslot for the positioning signal in the mobile terminal,
- obtain the transmission time of the positioning signal, and
- measure a position of the mobile terminal by performing a calculation according to the obtained transmission time of the positioning signal measured by the two relays,
- wherein the two relays are configured to measure the transmission time of the positioning signal with the mobile terminal according to the instruction from the serving base station or the upper level relay; and
- the mobile terminal is configured to measure the transmission time of the positioning signal with the serving base station or the upper level relay and the two relays respectively according to the instruction from the serving base station or the upper level relay.

13. The system according to claim 12, wherein
the serving base station or the upper level relay, is configured to:
- allocate an uplink resource for the mobile terminal if the positioning signal is an uplink signal;
- receive the positioning signal over the uplink resource;
- measure the transmission time of the positioning signal;
- receive the transmission time of the positioning signal measured by the two relays from the two relays; and
- measure the position of the mobile terminal according to the transmission time of the positioning signal measured by the serving base station of an upper level relay and the two relays.

14. The system according to claim 12, wherein
the serving base station or the upper level relay is configured to:
- allocate a downlink resource for the serving base station or the upper level relay and the two relays if the positioning signal is a downlink signal;
- notify the mobile terminal;
- send the positioning signal over the allocated downlink resource;
- receive the transmission time of the positioning signal measured by the mobile terminal; and
- measure the position of the mobile terminal according to the transmission time of the positioning signal measured by the mobile terminal.

15. The system according to claim 12, wherein
the serving base station or the upper level relay is configured to:
- allocate a downlink resource for the serving base station or the upper level relay and the two relays if the positioning signal is a downlink signal;
- notify the mobile terminal;
- send the positioning signal over the allocated downlink resource;
- receive a difference in the transmission time of the positioning signal between each of the two relays and the serving base station or the upper level relay measured by the mobile terminal; and
- measure the position of the mobile terminal according to the difference in the transmission time of the positioning signal measured by the mobile terminal.

16. A relay for positioning a mobile terminal, comprising:
- a transceiver unit configured to receive at least one of a preamble sequence and a reference signal having information of a resource for a positioning signal,
- receive a sent positioning signal, at a timeslot determined based on the at least one of the preamble sequence and the reference signal, according to an instruction from a serving base station or an upper level relay; and
- a positioning unit configured to measure a transmission time of the positioning signal with the mobile terminal, and send the transmission time of the positioning signal to the serving base station or the upper level relay.

17. The relay according to claim 16, wherein the positioning signal is an uplink ranging signal, and the relay further comprises:
the transceiver unit configured to:
receive a measurement notification message from the serving base station or the upper level relay,
send the same to the positioning unit, and
send the obtained transmission time of the uplink ranging signal to the serving base station or the upper level relay; and
the positioning unit configured to:
obtain the transmission time by performing measurement when receiving the uplink ranging signal sent from the mobile terminal, and send the obtained transmission time of the uplink ranging signal to the transceiver unit.

18. The relay according to claim 16, wherein the positioning signal is a downlink positioning signal, and the relay further comprises:
the transceiver unit configured to:
receive a measurement notification message from the serving base station or the upper level relay,
send the same to the positioning unit, and
send the downlink positioning signal to the mobile terminal according to an instruction from the positioning unit; and
the positioning unit configured to:
instruct the transceiver unit to send the downlink positioning signal to the mobile terminal after receiving the measurement notification message sent from the transceiver unit.

19. The method according to claim 9, wherein the downlink positioning signal sent by the serving base station or the upper level relay and the two relays over the allocated downlink resource respectively comprises:
an orthogonal sequence inserted into a downlink system frame, or
a spread spectrum sequence being orthogonal to a preamble timeslot that is inserted into a preamble sequence timeslot in a downlink system; and
the downlink positioning signal comprises:
the preamble sequence timeslot in the downlink system.

20. The method according to claim 9, wherein sending the positioning signal over the allocated downlink resource respectively comprises:
setting, with respect to the allocated downlink resource, an advanced timeslot; and
sending the downlink positioning signal in the advanced timeslot.

21. The method according to claim 1, wherein calculating the position of the mobile terminal comprises calculating the position of the mobile terminal according to the transmission time of the positioning signal measured by the serving base station or the upper level relay.

22. The system according to claim 12, wherein the serving base station or the upper level relay is configured to calculate the position of the mobile terminal according to the transmission time of the positioning signal measured by the serving base station or the upper level relay.

* * * * *